(12) United States Patent
Kim et al.

(10) Patent No.: US 9,214,833 B1
(45) Date of Patent: Dec. 15, 2015

(54) REDUNDANT CHARGING AND DISCHARGING MOSFET DRIVING IN BATTERY BACKUP SYSTEM

(75) Inventors: Sangsun Kim, San Jose, CA (US); William Dailey, Redwood City, CA (US); Craig Kaneshiro, San Jose, CA (US); Shane R. Nay, San Jose, CA (US); Cornelius O'Sullivan, Mountain View, CA (US)

(73) Assignee: Google Inc., Mountain View, CA (US)

( * ) Notice: Subject to any disclaimer, the term of this patent is extended or adjusted under 35 U.S.C. 154(b) by 624 days.

(21) Appl. No.: 13/617,669

(22) Filed: Sep. 14, 2012

Related U.S. Application Data

(60) Provisional application No. 61/590,060, filed on Jan. 24, 2012.

(51) Int. Cl.
    *H02J 7/00*     (2006.01)
    *H02J 9/00*     (2006.01)

(52) U.S. Cl.
    CPC ............... *H02J 9/00* (2013.01); *H02J 7/0068* (2013.01); *H02J 7/00* (2013.01)

(58) Field of Classification Search
    CPC .............. H02J 9/00; H02J 7/00; H02J 7/0068
    USPC .............. 307/23, 43, 63–66; 320/118, 127, 320/135–138; 700/286, 297
    See application file for complete search history.

(56) References Cited

U.S. PATENT DOCUMENTS

| | | | |
|---|---|---|---|
| 4,730,121 A * | 3/1988 | Lee et al. | 307/66 |
| 5,216,286 A | 6/1993 | Peterson | |
| 5,488,531 A | 1/1996 | Aldridge et al. | |
| 5,656,915 A * | 8/1997 | Eaves | 320/118 |
| 5,764,032 A | 6/1998 | Moore | |
| 5,801,937 A * | 9/1998 | Gold et al. | 363/141 |

(Continued)

FOREIGN PATENT DOCUMENTS

| | | |
|---|---|---|
| JP | 09308134 A | 11/1997 |
| JP | 2007306662 A | 11/2007 |

OTHER PUBLICATIONS

International Search Report & Written Opinion dated May 15, 2013 for Application No. PCT/US2013/022458.

(Continued)

*Primary Examiner* — Stacy Whitmore
(74) *Attorney, Agent, or Firm* — Lerner, David, Littenberg, Krumholz & Mentlik, LLP

(57) ABSTRACT

Aspects of the disclosure relate generally to uninterruptible power supply units for systems requiring back up power. Each unit may include UPS circuitry for controlling charging and allowing discharging of a battery. The UPS circuitry may includes a controller and a plurality of metal-oxide semiconductor field effect transistors ("MOSFET") switches. The MOSFETs may include charging and discharging MOSFETs arranged in series with the battery all driven by a single gate driver, such as a controller. In this regard, the controller may limit the charging current though all of the MOSFETs and charge the battery. The MOSFETs may be arranged such that if the charging MOSFET fails, the redundant charging MOSFET may continue to limit the charging current to the battery. Similarly, a redundant discharging MOSFET may be arranged in series with a discharging MOSFET in order to continue to provide discharging current if the discharging MOSFET fails.

22 Claims, 6 Drawing Sheets

(56) References Cited

U.S. PATENT DOCUMENTS

| | | | |
|---|---|---|---|
| 5,869,969 A | 2/1999 | Cividino et al. | |
| 6,040,683 A * | 3/2000 | Mottier | 320/137 |
| 6,157,171 A * | 12/2000 | Smith | 320/133 |
| 6,903,533 B1 | 6/2005 | Geren et al. | |
| 7,245,469 B2 | 7/2007 | Nemoto et al. | |
| 7,432,617 B2 | 10/2008 | Kanouda et al. | |
| 7,868,480 B2 * | 1/2011 | Miles | 307/43 |
| 8,432,136 B2 | 4/2013 | Ashida | |
| 8,803,360 B2 * | 8/2014 | Konecny et al. | 307/43 |
| 2001/0033502 A1 | 10/2001 | Blair et al. | |
| 2002/0136042 A1 | 9/2002 | Layden et al. | |
| 2003/0205939 A1 * | 11/2003 | Crosman et al. | 307/64 |
| 2005/0036253 A1 | 2/2005 | Tian et al. | |
| 2005/0037241 A1 * | 2/2005 | Schneider et al. | 429/9 |
| 2005/0043859 A1 | 2/2005 | Tsai et al. | |
| 2005/0057100 A1 * | 3/2005 | Crusius et al. | 307/66 |
| 2005/0275373 A1 * | 12/2005 | Guang et al. | 320/116 |
| 2006/0076933 A1 * | 4/2006 | Mandai | 320/135 |
| 2007/0075684 A1 * | 4/2007 | Liu et al. | 320/128 |
| 2007/0109708 A1 | 5/2007 | Hussman et al. | |
| 2007/0236204 A1 * | 10/2007 | Tateno et al. | 323/316 |
| 2007/0262761 A1 * | 11/2007 | Ishigaki et al. | 323/282 |
| 2008/0265682 A1 | 10/2008 | Huang et al. | |
| 2009/0009005 A1 | 1/2009 | Luo et al. | |
| 2009/0072623 A1 | 3/2009 | Liao | |
| 2009/0267587 A1 * | 10/2009 | Tateno et al. | 323/316 |
| 2010/0013312 A1 | 1/2010 | Groff et al. | |
| 2010/0237828 A1 | 9/2010 | Maegawa | |
| 2011/0040450 A1 * | 2/2011 | Izutani et al. | 701/43 |
| 2011/0085275 A1 * | 4/2011 | Ohshima | 361/93.7 |
| 2011/0095727 A1 | 4/2011 | Yeh et al. | |
| 2011/0148200 A1 * | 6/2011 | Burns et al. | 307/43 |
| 2011/0260544 A1 | 10/2011 | Imai et al. | |
| 2011/0285352 A1 * | 11/2011 | Lim et al. | 320/118 |
| 2012/0068541 A1 | 3/2012 | Anderson | |
| 2012/0235488 A1 * | 9/2012 | Hamanaka et al. | 307/64 |
| 2012/0319653 A1 | 12/2012 | Kumar et al. | |
| 2013/0038295 A1 * | 2/2013 | Kao et al. | 320/136 |
| 2013/0043841 A1 * | 2/2013 | Wei | 320/118 |
| 2013/0187468 A1 * | 7/2013 | Kim et al. | 307/65 |
| 2013/0187471 A1 * | 7/2013 | Kim et al. | 307/66 |

OTHER PUBLICATIONS

International Search Report & Written Opinion dated Apr. 25, 2013 for Application No. PCT/US2013/022039.

\* cited by examiner

REDUNDANT CHARGING AND DISCHARGING MOSFET DRIVING IN BATTERY BACKUP SYSTEM

CROSS-REFERENCE TO RELATED APPLICATION

The present application claims the benefit of the filing date of U.S. Provisional Patent Application No. 61/590,060 filed Jan. 24, 2012, the disclosure of which is hereby incorporated herein by reference.

BACKGROUND

Various systems utilize battery backup supply systems, such as uninterruptible power supply ("UPS") units. The UPS units include batteries that are charged during periods when the system is being powered by an external power source. If the power source is lost, the batteries are used to power the system's load. A typical system may use two different power supplies, one to run the components (such as devices in a server array) and another to charge the batteries. This arrangement may also require that the system have separate charging and discharging circuits for the UPS units. These dual arrangements can be relatively costly to produce, set up, and power.

Conventional UPS units often use a mechanical switch or relay in series with the batteries to disconnect the battery from the power source, such as a DC bus. Typically, these mechanical switches are not used to control the charging of multiple batteries as they are not able to regulate the individual charging current of each battery. An AC-DC power supply is able to limit the battery current of only a single UPS by regulating a common DC bus voltage. This also does not allow for individual control of the charging current. In such systems, the charging current is dependent upon the characteristics of the batteries within the UPS. In addition, the charging power of the UPS is unknown, so provisioning power for both an AC source and an AC-DC power supply cannot be adequately planned. Without limiting the battery charging current of individual UPS units, the AC-DC power supply must be over-rated to support the load and overall unknown charging power. Batteries that exceed the recommended charging current may heat up, thus shortening the battery's lifetime and causing safety concerns.

SUMMARY

One aspect of the disclosure provides an uninterruptible power supply unit including a battery. The uninterruptible power supply unit also includes first, second, third, and fourth MOSFET switches each connected in series with the battery. The first MOSFET and second MOSFET switches are configured to charge the battery when the first and second MOSFET switches are operating in a linear region. The uninterruptible power supply unit includes a single gate driver configured to drive all of the first, second, third, and fourth MOSFET switches together.

In one example, the uninterruptible power supply unit also includes a feedback device arranged in series with the first, second, third, and fourth MOSFET switches. This feedback device is configured to provide feedback information to the gate driver, and the gate driver is also configured to control current through the first and second MOSFET switches based on the feedback information. In this example, the feedback device includes a shunt resistor. The gate driver is also configured to adjust a gate-to-source voltage of the first MOSFET switch and the second MOSFET switch based on the feedback information. In another example, the second MOSFET switch and the first MOSFET switch are arranged such that when the first MOSFET switch fails, the second MOSFET switch continues to operates in the linear region to charge the battery. In this example, the uninterruptible power supply unit also includes a diode configured to isolate the first MOSFET switch when the first MOSFET switch fails. In another example, the gate driver includes an amplifier.

In another example, the third and fourth MOSFET switches are configured such that when the charging current falls below a threshold value, the third and fourth MOSFET switches are switched on, where that the third and fourth MOSFET switches operate in a switching region, and the third and fourth MOSFET switches provide discharging current from the battery. In another example, the first and third MOSFET switches are configured to operate as a bidirectional switch. In another example, the second and fourth MOSFET switches are configured to operate together as a bidirectional switch. In another example, the first and second MOSFET switches are configured closer to the battery than a signal ground and the third and fourth MOSFET switches are configured closer to the signal ground than the battery. In another example, the uninterruptible power supply unit includes a protection circuit configured to switch all of the first, second, third, and fourth MOSFET switches to an off condition and disconnect the uninterruptible power supply unit from an external power source when the uninterruptible power supply unit is operating outside of a predetermined normal operating range while the battery is charging. In another example, the uninterruptible power supply unit also includes a protection circuit configured to switch all of the first, second, third, and fourth MOSFET switches to an off condition and disconnect the uninterruptible power supply unit from an external load when the uninterruptible power supply unit is operating outside of a predetermined normal operating range while the battery is discharging.

Another aspect of the disclosure provides a system. The system includes a load configured to receive power from a power supply, and an uninterruptible power supply unit in communication with the load. The uninterruptible power supply unit includes a battery and first, second, third, and fourth MOSFET switches each connected in series with the battery. The first MOSFET and second MOSFET switches charge the battery when the first and second MOSFET switches are operating in a linear region. The uninterruptible power supply unit also includes a single gate driver driving all of the first, second, third, and fourth MOSFET switches together.

In one example, the uninterruptible power supply unit also includes a feedback device arranged in series with the first, second, third, and fourth MOSFET switches. This feedback device is configured to provide feedback information to the controller, and the gate driver is also configured to control current through the first and second MOSFET switches based on the feedback information. In another example, the second MOSFET switch and the first MOSFET switch are arranged such that when the first MOSFET switch fails, the second MOSFET switch continues to operates in the linear region to charge the battery. In another example, the third and fourth MOSFET switches are configured such that when the charging current falls below a threshold value, the third and fourth MOSFET switches are switched on, where that the third and fourth MOSFET switches operate in a switching region, and the third and fourth MOSFET switches provide discharging current from the battery. In another example, the first and second MOSFET switches are configured proximate to the battery and the third and fourth MOSFET switches are configured proximate to a signal ground. In another example, the uninterruptible power supply unit further comprises a protection circuit configured to switch all of the first, second, third, and fourth MOSFET switches to an off condition and disconnect the uninterruptible power supply unit from an external power source when the uninterruptible power supply unit is operating outside of a predetermined normal operating range while the battery is charging. In another example, the uninterruptible power supply unit also includes a protection circuit configured to switch all of the first, second, third, and fourth MOSFET switches to an off condition and disconnect the uninterruptible power supply unit from the load when the uninterruptible power supply unit is operating outside of a predetermined normal operating range while the battery is discharging.

A further aspect of the disclosure provides an uninterruptible power supply unit. The uninterruptible power supply unit includes a battery as well as a first MOSFET switch and a second MOSFET switch connected in series with and closer to the battery than a signal ground. The first MOSFET switch and the second MOSFET switch are configured to charge the battery when the first MOSFET switch and the second MOSFET switch are operating in a linear region. The uninterruptible power supply unit also includes a single gate driver for controlling current through the first MOSFET switch and the second MOSFET switch. The uninterruptible power supply unit includes a third MOSFET switch connected in series to the first and second MOSFET switches. The third MOSFET switch is closer to a signal ground than the battery, and the third MOSFET switch is configured to provide discharging current when the third MOSFET is in the fully on condition of the switching mode.

In one example, the uninterruptible power supply unit also includes a fourth MOSFET switch in series with the first, second and third MOSFET switches. This fourth MOSFET switch is configured to charge the battery when the fourth MOSFET switch and the fourth MOSFET switch are operating in a linear region.

Yet another aspect of the disclosure provides an uninterruptible power supply unit. The uninterruptible power supply unit includes a battery and a first MOSFET switch connected in series with and proximate to the battery. The first MOSFET switch is configured to charge the battery when the first MOSFET switch is operating in a linear region. The uninterruptible power supply unit also includes a second MOSFET switch connected in series to the first MOSFET switch. The second MOSFET switch is configured to provide discharging current when the second MOSFET is in a fully on condition of a switching mode. uninterruptible power supply unit includes a third MOSFET switch connected in series to the first and second MOSFET switches. The third MOSFET switch is configured to provide discharging current when the third MOSFET is in the fully on condition of the switching mode. The second MOSFET switch and third MOSFET switch are proximate to a signal ground.

In another example, the uninterruptible power supply unit also includes a fourth MOSFET switch in series with the first, second and third MOSFET switches. In this example, the fourth MOSFET switch is configured to provide discharging current when the third MOSFET is in the fully on condition of the switching mode.

DETAILED DESCRIPTION

The configurations described herein disclose a driving circuit having redundant switches arranged in series in a UPS unit. In one example, two pairs of metal-oxide semiconductor field effect transistors ("MOSFET") switches arranged in series as a bi-directional switch may be driven by a single gate driver, for example, a controller. In such a configuration, the MOSFETs may be used for battery charging and discharging, hot swapping, and fast disconnecting of the UPS unit. For example, the MOSFETs may disconnect the battery or batteries from the DC bus in case of any faults detected within the UPS unit. The MOSFETs may also be used for discharging and charging, and thus, a separate battery charger or backup converter are not needed.

However, if one or more of the MOSFETs of the bi-directional switches fails, there may be no way to disconnect the battery from the DC bus in the event such an action is needed. Accordingly, additional MOSFET switches may be used. For example, rather than using a single pair of MOSFET switches for charging and discharging, a second pair of redundant MOSFET switches, again configured in series as a bi-directional switch, may be used. If one of the charging or discharging MOSFET switches fails, the redundant charging or discharging MOSFET switch of the second bi-directional switch may be able to disconnect the battery and provide redundant protection against any failures.

Figure 1:
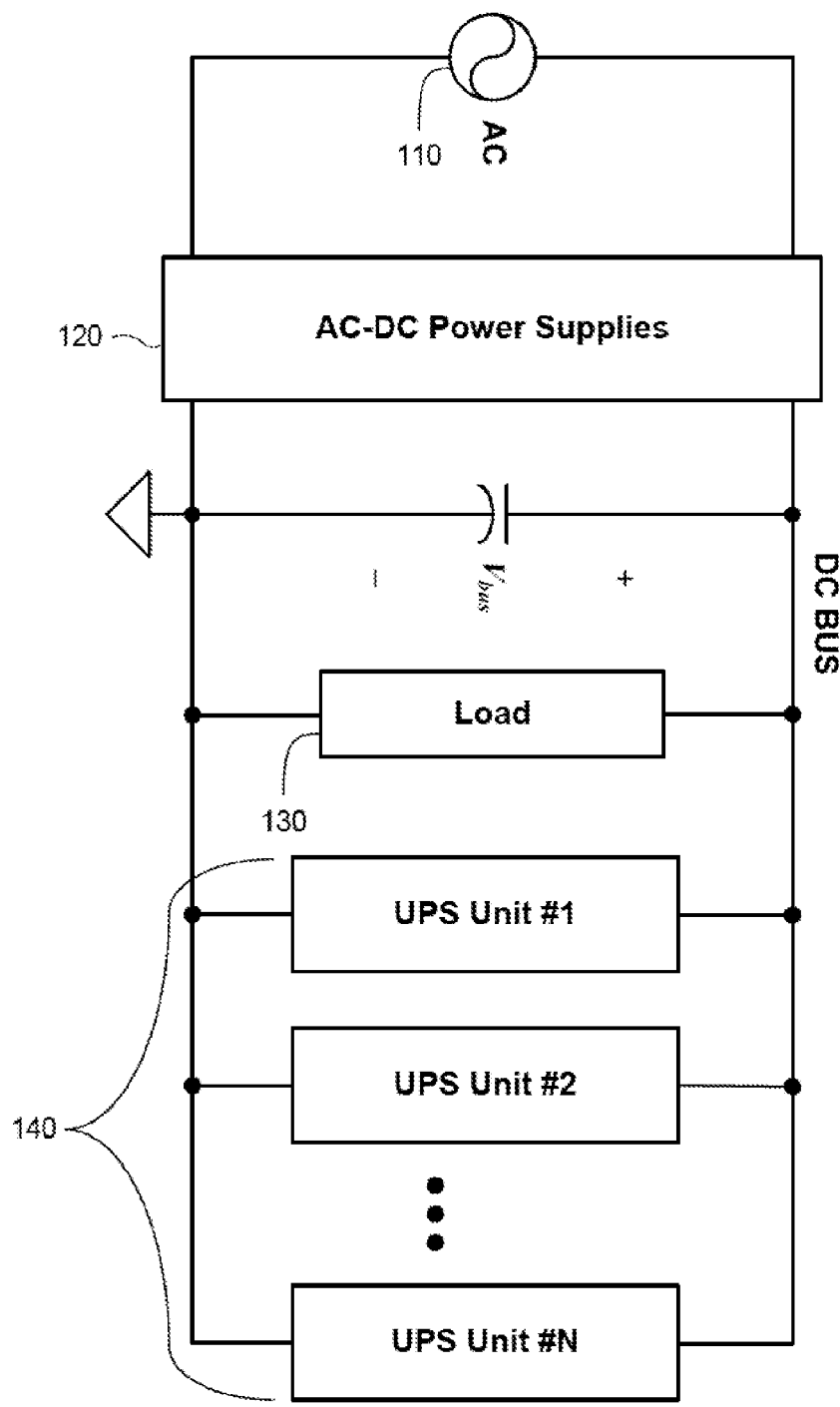
FIG. 1 is an example diagram of power architecture in accordance with implementations of the disclosure.

FIG. 1 is an example of a distributed power architecture 100 for a server system having a load and a plurality of UPS units 140. In this example, the architecture includes an AC power source 110 that supplies power to AC-DC power supplies 120. These power supplies may include, for example, one or more rectifiers. The AC-DC power supplies 120 provide power to a load 130. In this example, the load 130 may include a plurality of computing components.

The AC-DC power supplies 120 are also connected to the plurality of UPS units 140. As shown in FIG. 1, the UPS units 140 are arranged on a common DC distribution bus in parallel with the AC-DC power supplies 120 and the load 130. The UPS units 140 are used to ensure continued operation of the load 130 in the event of a failure of the AC power source 110 and/or AC-DC power supplies 120. The number of UPS units (N) used in the system may be determined based on the amount of backup power required to power the load for some predetermined period of time.

Figure 2:
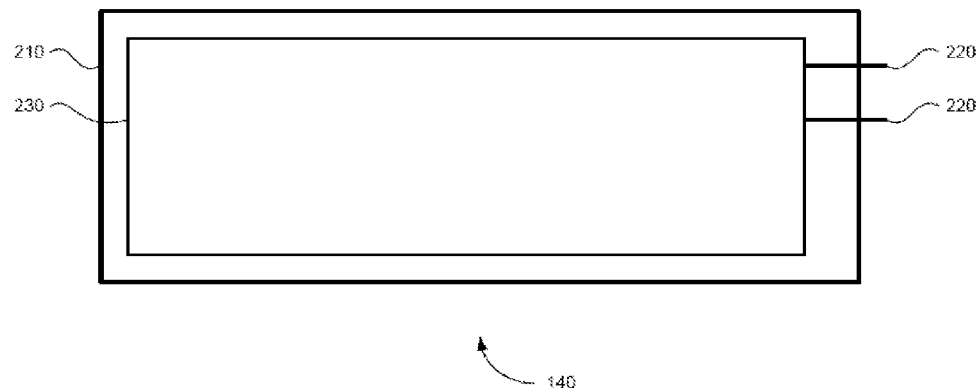
FIG. 2 is a diagram of a UPS unit in accordance with implementations of the disclosure.

FIG. 2 is an example of a UPS unit 140. In this example, the UPS unit 140 includes a housing 210, power terminals 220 to receive power from the AC-DC power supplies 120, and UPS circuitry 230.

Figure 3:
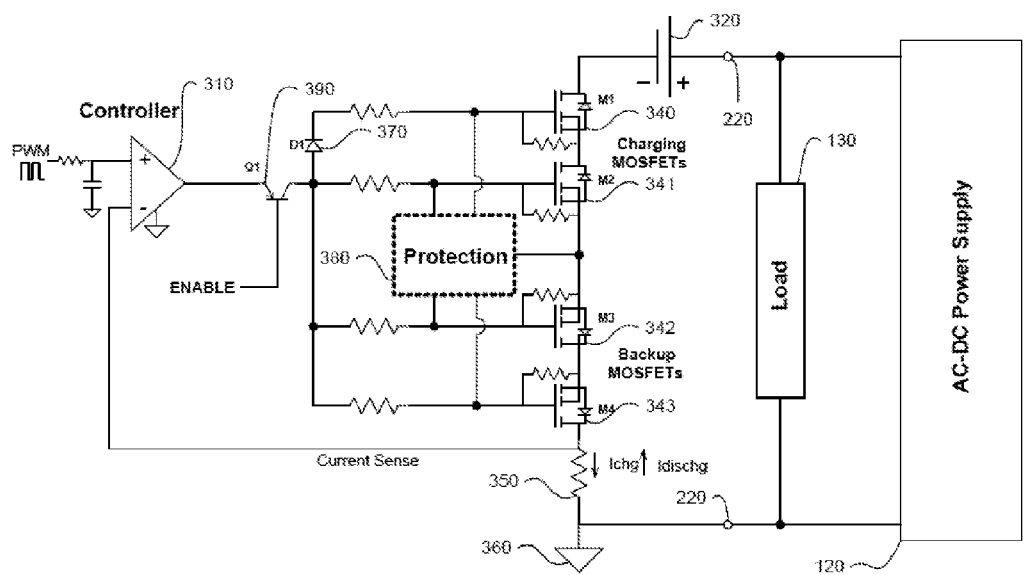
FIG. 3 is an example gate driving circuit for redundant discharging and charging MOSFETS in accordance with implementations of the disclosure.

As shown in FIG. 3, the UPS circuitry 230 may include a gate driving circuit having redundant charging and discharging MOSFETS in the UPS unit 140. In this example, the UPS circuitry includes a gate driver such as controller 310, a battery pack 320 having one or more batteries, switches 340-43, a feedback device 350, a signal ground 360, and a diode 370.

In addition, these circuits may also include a protection circuit 380 and a transistor 390 for fast off switching of the switches 340-43 based on temperature, voltage and current information associated with the batteries. As shown in these examples, the battery pack 320, the switches 340-43, and the feedback device 350 are arranged in series with one another. An additional protection circuit 380 may be associated with switch 342 for discharging.

The switches 340-43 desirably comprise MOSFET switches. MOSFET switches are used to supply current for battery charging and discharging. For example, MOSFETS 340-41 may be charging MOSFET switches that supply charging current to the battery pack 320. These charging MOSFET switches are located proximate to the battery pack 320. Similarly, MOSFETS 342-43 may be discharging MOSFET switches that supply discharging current from the battery pack 320. These discharging MOSFET switches are located proximate to the signal ground 360. The body diode of the discharging MOSFET provides a current path for the gate driving circuit. With this MOSFET arrangement, the MOSFET driving can be simplified with a single gate driver.

A pair of MOSFET switches may be used for both the charging and discharging of the batteries. For example, given the pair of MOSFET switches 340 and 342, MOSFET switch 340 can be used to control the charging of the batteries while MOSFET switch 342 can be used for discharging of the batteries. Similarly, given the pair of MOSFET switches 341 and 343, MOSFET switch 341 can be used to control the charging of the batteries while MOSFET switch 343 can be used for discharging of the batteries. These combinations of a charging MOSFET switch and a discharging MOSFET switch configured as a pair allows operation as a bidirectional switch.

Although FIG. 3 depicts four MOSFET switches driven by a single gate driver, other driving configurations having at least 1 pair of charging and discharging MOSFET switches configured as a bi-directional switch may also be used. For example, other configurations may include 2 charging MOSFET switches and 1 discharging MOSFET switch, 1 charging MOSFET switch and 2 discharging MOSFET switches, 1 charging MOSFET switch and 1 discharging MOSFET switch, or more than 2 charging MOSFET switches and more than 2 discharging MOSFET switches. In addition, multiple MOSFET switches may be connected in parallel to the charging and discharging MOSFET switches.

The MOSFET switches have different modes of operation. For example, a MOSFET have a switched mode of operation, including a "fully off" condition and a "fully on" condition. Another mode of operation is a linear region of operation where the drain-to-source voltage can be regulated by adjusting gate-to-source voltage. In this example, when operating in the linear region, the MOSFET allows a gate-to-source voltage of between 0 and 12 volts to pass through the MOSFET's gate. Whether the MOSFET switches are used as switches or in operated in their linear mode depends on whether the batteries are being charged (linear operation), discharged (on), or disconnected (off) from the load and the AC power supply.

Typically, to drive 4 MOSFET switches, 4 individual gate drivers would be used. However, when all of the MOSFET switches are in series and all the source terminals of the MOSFET switches are connected together, it may be difficult to simplify the gate drivers for the MOSFET switches. In the example of FIG. 3, a single gate driving circuit drives four MOSFET switches in series based on charging current feedback from a feedback device. The controller 310 may be, in one example, an amplifier configured to receive information from the feedback device 350. Based on the received information, the controller is able to automatically transition the UPS unit from using an outside power source to charge the battery to supplying power to a load. The feedback device 350 can include a shunt or current sense resistor. Here, the feedback device senses current from one of the power terminals 220 and sends it to the negative terminal of the controller 310.

The controller automatically detects the state of the bus voltage based on current feedback received from the feedback device 350. For example, when the DC bus voltage is greater than the battery voltage, the controller is in charging mode. In the charging mode, the controller regulates or limits the charging current through MOSFET switch 340 by adjusting the gate-to-source voltage of the MOSFET switch 340 based on current received from the feedback device 350. In one example, the controller 310 is desirably associated with a reference current value. This value can be set through a pulse-width modulation (PWM) signal 360 at the positive terminal of the controller 310. Thus, the reference current value is adjustable based on the needs of the system. For example, the AC-DC power supplies 120 must produce enough current to power the load 130 and the number of UPS units (N) for charging. Because the reference current for each UPS unit may be set, this allows for an accurate calculation of how much power is needed for the load and charging the UPS units.

In some examples, the reference charging current value is set very low in comparison to the discharging current needed to power the load. By using a relatively low charging current, the thermal stress on the charging MOSFET operating in the linear region is low as well. If the current through the charging MOSFET is too high, the MOSFET can heat up and fail. This can also reduce the power drain on the AC-DC power supplies 120.

When the terminals of UPS unit are initially connected to the power from the AC-DC power supplies 120, the controller receives charging current feedback from the feedback device 350. In response, the controller generates a gate voltage in order to activate the MOSFET switches. Using the 12 volt example, the controller 524 increases the gate voltage of the MOSFET switches to between 0 and 12 volts depending upon the reference current value. This can switch all of the MOSFET switches, to the active condition and allow the battery pack 320 to charge.

In this case, the controller compares reference current value and the information from the feedback device, and adjusts the current through the MOSFET 340 in order to control the charging of the battery pack 320. The charging current feedback at the negative terminal, received from the feedback device 350, follows the current defined at the positive terminal in voltage.

During the charging process, one of the charging MOSFET switches 340 and 341 may fail. For example, a MOSFET switch may short out. If this occurs, the other charging MOSFET switch is configured to automatically continue to allow the UPS unit to limit the charging current. Without the redundant charging MOSFET, for example, if there is only a single charging MOSFET, failure of the only charging MOSFET may cause the entire UPS unit to fail. Thus, the redundant charging MOSFET may allow the UPS unit to continue to limit the charging current while at the same time protecting the UPS unit. In this regard, as described above a plurality of redundant charging MOSFET switches may be arranged in series.

In the event of a failure of MOSFET 340, the diode 370 (D1) may be used to isolate this MOSFET. Without the diode 370, the gate-to-source voltage for the remaining MOSFETs (371-372) may exceed the maximum specified voltage.

When the charging current becomes a bit lower than the reference current value, the DC bus voltage will be very close to or the same as the battery voltage. At this point, the battery may be almost fully charged. In response to current feedback from the current sense device, the output of the controller may be saturated at the maximum gate voltage and the battery is float charged to keep the battery close to or at its fully charged level.

As noted above, the UPS circuitry 230 can also be used for discharging. If the power source 110 and/or AC-DC power supplies 120 fail, the power received at the terminals 220 of the UPS device will drop off. The DC bus voltage will be less than the battery voltage. This causes the charging current feedback to be significantly lower than the reference current value. The difference between the charging current feedback and the reference current value causes the controller's output to go into saturation and causes the MOSFET switches to go into the fully on condition. In other words, the MOSFET switches are no longer operating in the linear region. At this point, the controller is no longer controlling the charging of the battery pack 320, and the current from the battery pack can discharge and flow through the terminals 220 to power the load 130. Having the MOSFET switches in the fully on condition when the battery pack is discharging can also reduce conduction loss.

During the discharging process, one of the discharging MOSFET switches 342 and 343 may fail. If this occurs, the other discharging MOSFET switch is configured to automatically continue to provide the discharging current form the batteries. Without the redundant discharging MOSFET, for example, if there is only a single discharging MOSFET, failure of the only discharging MOSFET may cause the entire UPS unit to fail. Thus, the redundant discharging MOSFET may allow the UPS unit to continue to provide discharging current and the same time protecting the UPS unit. In this regard, as described above a plurality of redundant discharging MOSFET switches may be arranged in series.

The battery pack can continue to discharge until the battery pack is fully discharged or until the power source 110 and/or AC-DC power supplies 120 have been restored. When the power source has been restored, the UPS unit can automatically transition from discharging to charging via the controller.

Returning to the example of FIG. 3, when the power from the AC-DC power supplies 120 is restored, the charging current feedback causes the controller 310 to immediately regulate the charging current to the battery pack as described above.

The protection circuit 380 may be configured to turn off the MOSFET switches 340-43 in order to disconnect the battery from the DC bus. The protection circuit 380 may include a microcontroller, CPU, or any type of circuit that can sense the condition of the current, temperature or voltage of the battery. If one or more of these conditions is outside of a predetermined normal operating range (for example, operating at an abnormal voltage, current, and/or temperature), the protection circuit 380 may automatically switch the MOSFET switches 340-43 to the off condition through one or more NPN bipolar transistors (not shown) disconnecting the UPS from the AC-DC power supply and the load. The protection circuit may operate much faster to shut off the MOSFETs than the controller.

Figure 4:
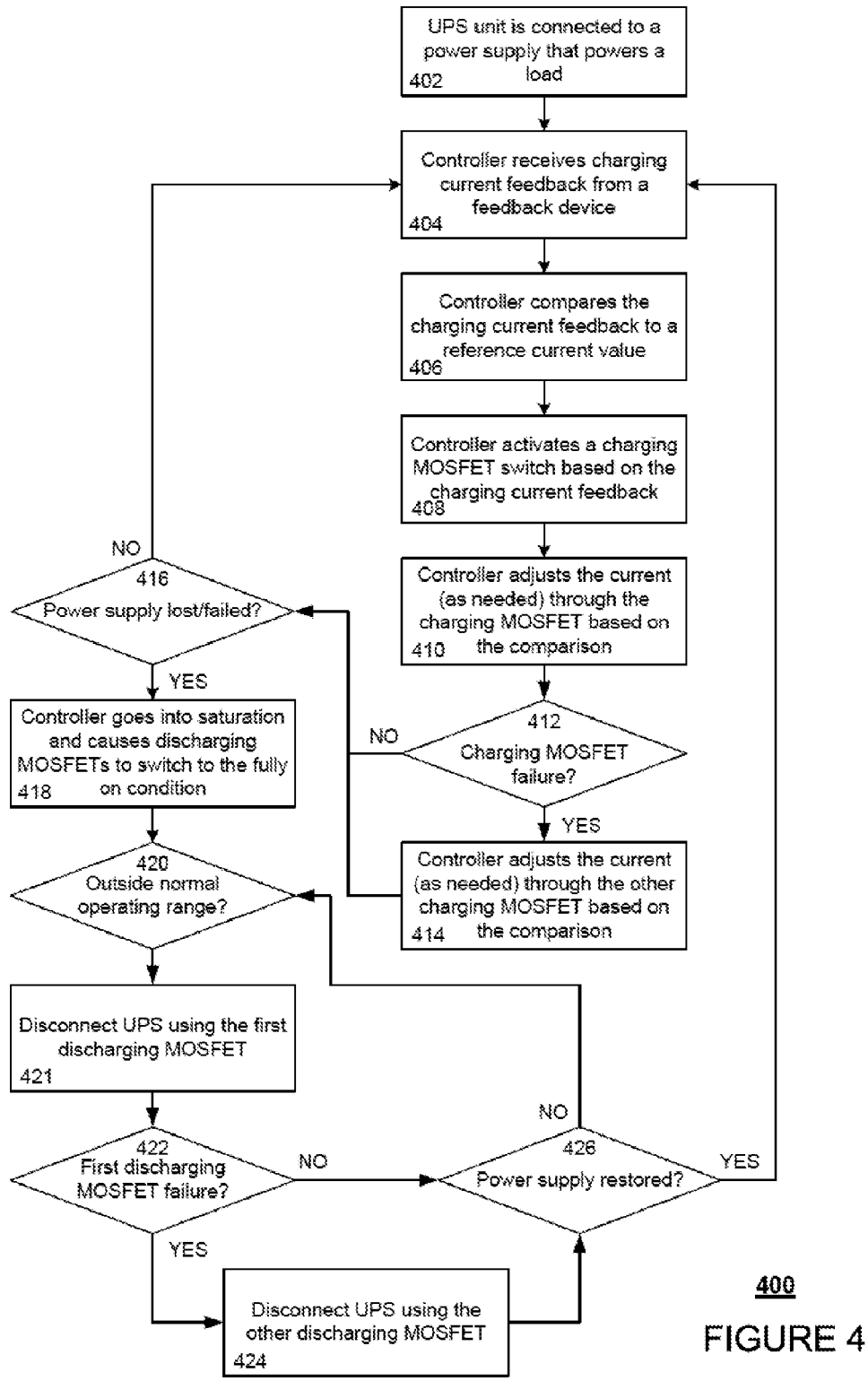
FIG. 4 is an example flow diagram in accordance with implementations of the disclosure.

Flow diagram 400 of FIG. 4 is an example of some of the aspects described above. In this example, a UPS unit is connected to a power supply that powers a load at block 402. For example, UPS unit 140 may be connected to AC power supply 110 or AC-DC power supplies 120 which supply power to load 130. A controller receives charging current feedback from a feedback device at block 404. For example, the controller 310, which may include an amplifier, receives charging current feedback from the feedback device 350, which can comprise a shunt resistor. At block 406, the controller compares the charging current feedback to a reference current value. The controller then activates a charging MOSFET switch based on the charging current feedback at block 408. As described above, the reference current can be predetermined based on the power needs of the system. The controller then adjusts the current through the charging MOSFET based on the comparison as needed at block 410. If during the charging process, the charging MOSFET fails, at block 412, the controller adjusts the current through the other (redundant) charging MOSFET based on the comparison as needed at block 414. In addition, the other MOSFET may be used as a disconnect device if the UPS unit operating outside of the normal operating range.

If there is no change in the power supply, for example, it has not been lost or failed at block 416, the charging controller continues to receive the charging current feedback at block 404. As described above, the controller compares the charging current feedback to a reference current value and adjusts the current through the charging MOSFET (or the other charging MOSFET) based on the comparison as needed at blocks 410, 412 or 414, respectively.

Returning to block 416, if the power supply has been lost or has failed, the controller goes into saturation and causes discharging MOSFETs to switch to the fully on condition at block 418. If, at block 420, the UPS unit operating outside of a normal operating range (for example, as described above), the UPS unit is disconnected at a first of the discharging MOSFET switches at block 421. If the first MOSFET switch has failed at block 422, the other (redundant) discharging MOSFET may be used to disconnect the UPS unit at block 424. The UPS unit may remain disconnected for example, until the UPS unit is operating within the normal operating range.

At block 426, if the UPS unit is operating within the normal operating range, the discharging current may be provided through the discharging MOSFET (or the other discharging MOSFET) until the power supply is restored. Alternatively, current through the discharging MOSFET can provide power to the load until the battery pack has been fully discharged. When the power supply has been restored, the flow returns to block 404 where the controller again receives charging current feedback from a feedback device. The flow then continues as described above.

The aspects and features described above are especially useful in systems where power is not expected to be lost often for long periods. For example, in a developed area with a reliable power source, it may be fairly rare to have a power failure. In these systems, the UPS units do not have to be fully charged quickly, but can be slowly built up over longer periods, such as a few hours or a whole day. However, when a failure does occur, a typical server array may rely on a backup generator which typically takes on the order of a half minute to power up. During this period, the battery pack provides the discharging current to the load. The rate of the discharging current may be much higher than that of the charging current.

In addition, the driving circuits described above address complex charging and discharging issues with simple and cost effective solutions. For example, by using an amplifier to control the charging current in a single UPS device, the charging current in a plurality of different UPS devices is regulated without requiring external oversight or monitoring. The arrangement of the paired charging and discharging MOSFET switches both eliminate the need for separate battery charging power supplies and reducing the total cost of the system.

Figure 5A:
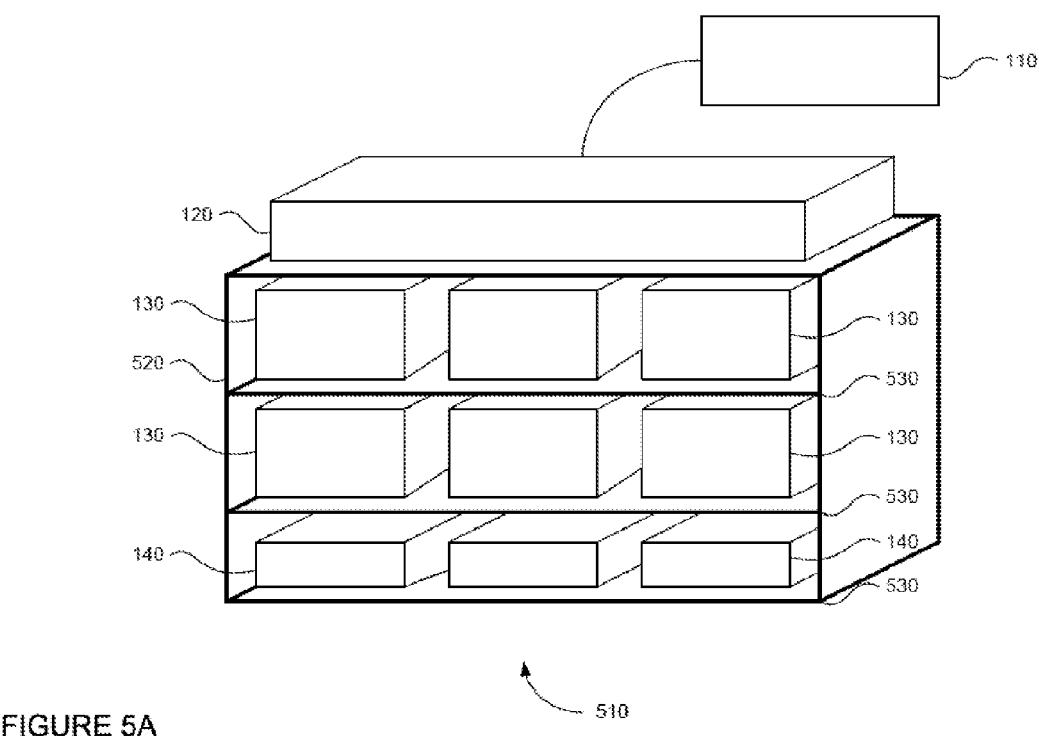
FIG. 5A is an example of a server architecture in accordance with implementations of the disclosure.

The UPS units described herein can be used in conjunction with various backup power systems. For example, these devices may be useful in telecom systems or server architectures. FIG. 5A is an example of a server architecture including a plurality of the UPS units described herein. In this example, the server 510 includes a rack 520, having a set of shelves 530, for housing the load 130 as well as the UPS units 140. The AC-DC power supplies 120 can be incorporated into the rack 510 (as shown in FIG. 5A) or can be at a different location, for example, as the AC power source 110 is shown in FIG. 5A.

The load 130 can include a variety of devices. For example, the load 130 can include a dedicated storage device, for example, including any type of memory capable of storing information accessible by a processor, such as a hard-drive, memory card, ROM, RAM, DVD, CD-ROM, or solid state memory. The load may include a preprogrammed load which draws power from the AC-DC power supplies 120 in order to test the operation of the server 510. The load 130 may also include a computer including a processor, memory, instructions, and other components typically present in server computers.

Figure 5B:
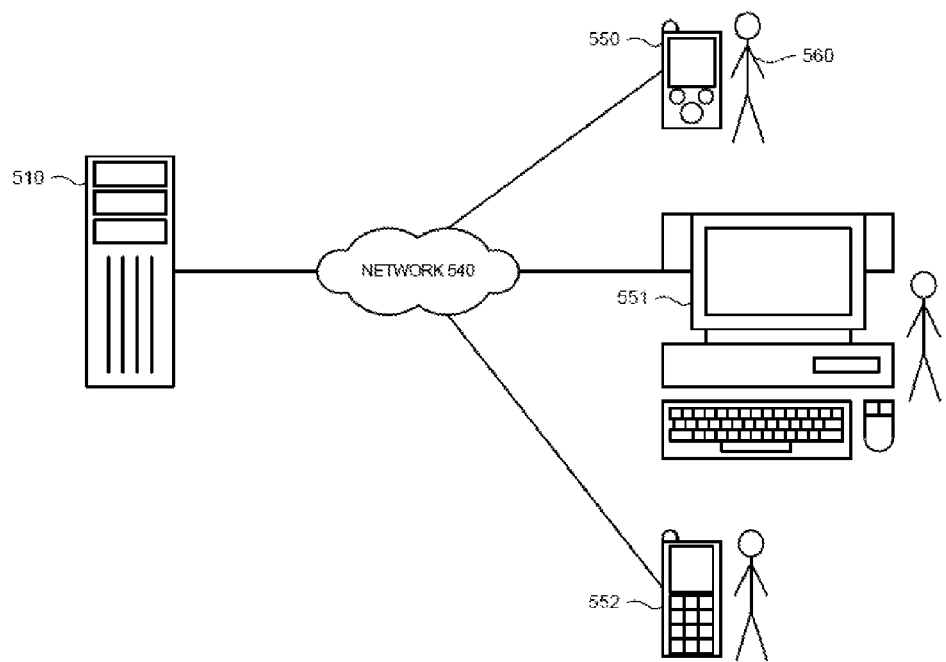
FIG. 5B is an example of a network system architecture in accordance with implementations of the disclosure.

FIG. 5B is an example of a network system including the server architecture of FIG. 5A. For example, server 510 may be at one node of a network 540 and capable of directly and indirectly communicating with other nodes of the network. For example, these computers may exchange information with different nodes of a network for the purpose of receiving, processing and transmitting data to one or more client devices 550-52 via network 540. In this regard, server 510 may transmit information for display to user 560 on display of client device 550. In the event of a failure of the AC power source 110, the UPS units may allow the server 510 to continue communications with the other nodes without interruption.

As these and other variations and combinations of the features discussed above can be utilized without departing from the subject matter defined by the claims, the foregoing description of the embodiments should be taken by way of illustration rather than by way of limitation of the subject matter defined by the claims. It will also be understood that the provision of the examples disclosed herein (as well as clauses phrased as "such as," "including" and the like) should not be interpreted as limiting the claimed subject matter to the specific examples; rather, the examples are intended to illustrate only one of many possible embodiments. Further, the same reference numbers in different drawings may identify the same or similar elements.

The invention claimed is:

1. An uninterruptible power supply unit comprising:
    a battery;
    first, second, third, and fourth MOSFET switches each connected in series with the battery, the first MOSFET and second MOSFET switches being configured to charge the battery when the first and second MOSFET switches are operating in a linear region, the third and fourth MOSFET switches are configured such that when the charging current falls below a threshold value, the third and fourth MOSFET switches are switched on such that the third and fourth MOSFET switches operate in a switching region provide discharging current from the battery; and
    a single gate driver configured to drive all of the first, second, third, and fourth MOSFET switches together.

2. The uninterruptible power supply unit of claim 1, further comprising a feedback device arranged in series with the first, second, third, and fourth MOSFET switches, the feedback device being configured to provide feedback information to the gate driver, wherein the gate driver is further configured to control current through the first and second MOSFET switches based on the feedback information.

3. The uninterruptible power supply unit of claim 2, wherein the feedback device includes a shunt resistor.

4. The uninterruptible power supply unit of claim 2, wherein the gate driver is configured to adjust a gate-to-source voltage of the first MOSFET switch and the second MOSFET switch based on the feedback information.

5. The uninterruptible power supply unit of claim 1, wherein the second MOSFET switch and the first MOSFET switch are arranged such that when the first MOSFET switch fails, the second MOSFET switch continues to operates in the linear region to charge the battery.

6. The uninterruptible power supply unit of claim 5, further comprising a diode configured to isolate the first MOSFET switch when the first MOSFET switch fails.

7. The uninterruptible power supply unit of claim 1, wherein the gate driver comprises an amplifier.

8. The uninterruptible power supply unit of claim 1, wherein the first and third MOSFET switches are configured to operate together as a bidirectional switch.

9. The uninterruptible power supply unit of claim 1, wherein the second and fourth MOSFET switches are configured to operate together as a bidirectional switch.

10. The uninterruptible power supply unit of claim 1, wherein the first and second MOSFET switches are configured closer to the battery than a signal ground and the third and fourth MOSFET switches are configured closer to the signal ground than the battery.

11. The uninterruptible power supply unit of claim 1, further comprising a protection circuit configured to switch all of the first, second, third, and fourth MOSFET switches to an off condition and disconnect the uninterruptible power supply unit from an external power source when the uninterruptible power supply unit is operating outside of a predetermined normal operating range while the battery is charging.

12. The uninterruptible power supply unit of claim 1, further comprising a protection circuit configured to switch all of the first, second, third, and fourth MOSFET switches to an off condition and disconnect the uninterruptible power supply unit from an external load when the uninterruptible power supply unit is operating outside of a predetermined normal operating range while the battery is discharging.

13. A system comprising:
    a load configured to receive power from a power supply;
    an uninterruptible power supply unit in electrical communication with the load, the uninterruptible power supply unit comprising:
        a battery;
        first, second, third, and fourth MOSFET switches each connected in series with the battery, the first MOSFET and second MOSFET switches charging the battery when the first and second MOSFET switches are operating in a linear region, the third and fourth MOSFET switches are configured such that when the charging current falls below a threshold value, the third and fourth MOSFET switches are switched on such that the third and fourth MOSFET switches operate in a switching region provide discharging current from the battery; and
        a single gate driver driving all of the first, second, third, and fourth MOSFET switches together.

14. The system of claim 13, wherein the uninterruptible power supply unit further comprises a feedback device arranged in series with the first, second, third, and fourth MOSFET switches, the feedback device being configured to provide feedback information to the controller, wherein the gate driver is further configured to control current through the first and second MOSFET switches based on the feedback information.

15. The system of claim 13, wherein the third and fourth MOSFET switches are configured such that when the charging current falls below a threshold value, the third and fourth MOSFET switches are switched on, where that the third and fourth MOSFET switches operate in a switching region, and the third and fourth MOSFET switches provide discharging current from the battery.

16. The system of claim 13, wherein the first and second MOSFET switches are configured closer to the battery than a signal ground and the third and fourth MOSFET switches are configured closer to the signal ground than the battery.

17. The system of claim 13, wherein the uninterruptible power supply unit further comprises a protection circuit configured to switch all of the first, second, third, and fourth MOSFET switches to an off condition and disconnect the uninterruptible power supply unit from an external power source when the uninterruptible power supply unit is operating outside of a predetermined normal operating range while the battery is charging.

18. The system of claim 13, wherein the uninterruptible power supply unit further comprises a protection circuit configured to switch all of the first, second, third, and fourth MOSFET switches to an off condition and disconnect the uninterruptible power supply unit from the load when the uninterruptible power supply unit is operating outside of a predetermined normal operating range while the battery is discharging.

19. An uninterruptible power supply unit comprising:
a battery;
a first MOSFET switch and a second MOSFET switch connected in series with and being proximate to the battery, the first MOSFET switch and the second MOSFET switch being configured to charge the battery when the first MOSFET switch and the second MOSFET switch are operating in a linear region; and
a single gate driver for controlling current through the first MOSFET switch and the second MOSFET switch; and
a third MOSFET switch connected in series to the first and second MOSFET switches, the third MOSFET switch being proximate to a signal ground, the third MOSFET switch being configured to provide discharging current when the third MOSFET is in the fully on condition of the switching mode.

20. The uninterruptible power supply unit of claim 19, further comprising a fourth MOSFET switch in series with the first, second and third MOSFET switches, the fourth MOSFET switch being configured to charge the battery when the third MOSFET switch and the fourth MOSFET switch are operating in a linear region.

21. An uninterruptible power supply unit comprising:
a battery;
a first MOSFET switch connected in series with and being proximate to the battery, the first MOSFET switch being configured to charge the battery when the first MOSFET switch is operating in a linear region;
a second MOSFET switch connected in series to the first MOSFET switch, the second MOSFET switch being configured to provide discharging current when the second MOSFET is in a fully on condition of a switching mode; and
a third MOSFET switch connected in series to the first and second MOSFET switches, the third MOSFET switch being configured to provide discharging current when the third MOSFET is in the fully on condition of the switching mode, wherein the second MOSFET switch and third MOSFET switch are closer to the signal ground than the battery.

22. The uninterruptible power supply unit of claim 21, further comprising a fourth MOSFET switch in series with the first, second and third MOSFET switches, the fourth MOSFET switch being configured to provide discharging current when the third MOSFET is in the fully on condition of the switching mode.

* * * * *